United States Patent Office 2,928,803
Patented Mar. 15, 1960

2,928,803

CURING OF POLYEPOXIDES

William J. Belanger and Harold G. Cooke, Jr., Louisville, Ky., assignors to Devoe & Raynolds Co., Inc., a corporation of New York No Drawing. Application October 5, 1956
Serial No. 614,067

6 Claims. (Cl. 260—43)

This invention relates to curable phenol-epoxide compositions and particularly to the preparation of epoxide compositions capable of conversion into insoluble, infusible products valuable in making coatings, castings, pottings, laminates, adhesives, and the like.

Phenols are not used extensively in the curing of polyepoxides because quite high temperatures are necessary in order to obtain effective cures. This invention, however, provides a process whereby phenol-epoxide compositions are cured at temperatures lower than those normally required. The phenol-epoxide compositions are prepared according to this invention by reacting a polyhydric phenol and a polyepoxide in the presence of a special accelerator. In addition, by the practice of this invention curing periods are varied by changing the amount of accelerator employed in conjunction with the phenol-polyepoxide mixture.

Thus, according to an embodiment of this invention, a new process is provided for curing polyepoxides to form cross-linked products using polyhydric phenols and accelerators or activators for these phenols not heretofore suggested for this use. It has been found that quaternary ammonium salts of strong acids are capable of accelerating the reaction between polyepoxides and polyhydric phenols. At a given temperature and with a particular polyhydric phenol, lower curing temperatures can be used, and, faster curing times can be produced by increasing the amount of activator. These quaternary ammonium salts have the additional advantage of being neutral and in admixture with polyepoxides they are stable until heated.

This invention thus provides a process for curing polyepoxides which includes mixing and reacting the polyepoxide with a polyhydric phenol and an activator for the phenol comprising a neutral salt, i.e., a quaternary ammonium salt of a strong acid, preferably a quaternary ammonium halide. It has been found that when polyhydric phenols are used in combination with these activators they display surprisingly increased activity as curing agents for polyepoxides.

Polyepoxides with which this invention is concerned are now well known and need not be discussed at length herein. The most useful of these epoxide resins is made from the reaction of a polyhydric phenol with epihalohydrin or glycerol dihalohydrin and a sufficient amount of a caustic alkali to combine with the halogen of the halohydrin. Products resulting from the reaction of a polyhydric phenol with epichlorhydrin or glycerol dichlorhydrin are monomeric or straight chain polymeric products characterized by the presence of more than one epoxide group, i.e., a 1,2-epoxy equivalency greater than one. Dihydric phenols that can be used for this purpose include bisphenol, resorcinol, catechol, hydroquinone, methyl resorcinol, 2,2-bis(4-hydroxyphenyl)butane, 4,4'-dihydroxybenzophenone, bis(4-hydroxyphenyl)ethane, and 1,5-dihydroxy naphthalene. The preparation of polyepoxides from polyhydric phenols and epihalohydrin is described in U.S. Patents 2,467,171, 2,538,072, 2,582,985, 2,615,007 and 2,698,315, the proportion of the halohydrin (epichlorhydrin or glycerol dichlorhydrin) to dihydric phenol being at least about 1.2 to one up to around ten to one.

Higher melting point resins are made from the reaction of such resins with a further amount of dihydric phenol less than that equivalent to the epoxide content of the resin, as set forth in U.S. Patent 2,615,008. Halohydrins can be further exemplified by 3-chloro-1,2-epoxy butane, 3-bromo-1,2-epoxy hexane, 3-chloro-1,2-epoxy octane, and the like. Another group of polyepoxides is produced by the reaction of a polyhydric alcohol with epichlorhydrin or glycerol dichlorhydrin as disclosed in Zech Patent 2,581,464. Any of the various polyepoxides made from phenols or alcohols and epichlorhydrin as described can be used in accordance with this invention. It is preferred, however, to employ a polyepoxide having a weight per epoxide below one thousand.

Any of the known polyhydric phenols can be used in the practice of this invention. The polyhydric phenols employed are mono or poly nuclear phenols having two or more phenolic hydroxyl groups linked to separate nuclear aromatic carbon atoms. Among suitable compounds of this class are mononuclear phenols, for example, resorcinol, catechol, orcinol, xylorcinol, apionol, etc., as well as polynuclear phenols such as bis(4-hydroxyphenyl)-2,2-propane (bisphenol), 4,4'-dihydroxy benzophenone, bis(4-hydroxyphenyl)-1,1-ethane, bis(4-hydroxyphenyl)-1,1-isobutane, bis(4-hydroxyphenyl)-2,2-butane, bis(4-hydroxy-2-methyl phenyl)-2,2-propane, bis(4-hydroxy-2-tert-butyl phenyl)-2,2-propane, bis(2-hydroxynaphthyl)methane, 1,3-dihydroxynaphthalene, 1,2,5,6-tetrahydroxynaphthalene, etc. The polyhydric phenols well suited for use in the invention are of the formula $R(OH)_n$, wherein $n$ is an integer of two to four, each hydroxyl group being linked directly to a different nuclear carbon atom of R which is an aromatic hydrocarbon radical.

One class of polyhydric phenols particularly useful as curing agents in accordance with this invention is the group of compounds containing more than two phenolic hydroxyl groups per mol. Examples of compounds of this type are phloroglucinol (other trihydric phenols) and phenol-aldehyde condensates. Desirable phenol-aldehyde condensates are commercial thermoplastic resins made from phenols or alkyl phenols and formaldehyde and having more than two phenolic hydroxyls per mol, say, two to twelve.

Another class of polyhydric phenols useful as curing agents is the diphenols. By diphenol is meant (a) a polynuclear phenol having two phenolic hydroxyl groups as its sole reactive groups such as dihydroxydiphenylmethanes, their isomers, their homologs, and their substituted compounds and (b) a benzene ring having two hydroxyls such as resorcinol and the like. Included in addition to resorcinol are other dihydric phenols, for example, hydroquinone and catechol. Examples of such compounds are 4,4'-diphenols made by the condensation of phenols with aldehydes, and dihydroxydiphenylmethane, dihydroxydiphenylmethylmethane, dihydroxydiphenyldimethylmethane, dihydroxydiphenylethylmethane, dihydroxydiphenyldiethylmethane, dihydroxydiphenylmethylpropylmethane, and dihydroxydiphenylethylphenylmethane. Also important are compounds containing two benzene nuclei linked to each other directly or through other atoms or atom groups, for example, $-(CH_2)_n-$, $-SO_2-$, $-O-$, $-CO-$, and $CR_2-$, and having two phenolic hydroxyl groups as their sole reactive groups.

Neutral quaternary ammonium salts within the contemplation of this invention are tetraalkyl, aryl, trialkyl and alkaryl trialkyl ammonium salts of strong acids wherein the aryl, alkaryl and alkyl substituents each have no more than eight carbon atoms. Examples of such quaternary ammonium compounds include benzyltrimethyl ammonium chloride, benzyltrimethyl ammonium phosphate, trimethyl benzyl ammonium sulphates, benzyltriethyl ammonium chloride, tributyl benzyl ammonium chloride, tripropyl benzyl ammonium chloride, tolyl trimethyl ammonium chloride, octyl trimethyl ammonium bromide, ethylene bis(trimethyl ammonium bromide), etc., preferred salts being quaternary ammonium halides. Also intended are ion exchange resins containing quaternary ammonium salts of strong acids.

In carrying out the process of this invention the polyepoxide is cured by admixing therewith the polyhydric phenol as well as the activator. The amount of phenol to be used in the process depends, of course, on many factors such as the type of polyhydric phenol and the epoxide content of the polyepoxide. Good cures are obtained by reacting the polyepoxide with one of more phenolic hydroxyls per epoxide group of polyhydric phenol and from 0.1 to ten percent by weight of the polyepoxide-phenol mixture of the quaternary ammonium salt. Generally from 0.1 to one phenol equivalent (weight per phenolic hydroxyl) is employed per epoxide group (one epoxy equivalent). However, in the case of polyfunctional phenols such as phenol formaldehyde condensates, tri and tetra hydric phenols, etc., cross linking can be obtained with a ratio of greater than one phenolic hydroxyl per epoxy equivalent. The quaternary ammonium salts, on the other hand, are needed only in very small amounts, excellent results being obtained when the activator is utilized in amounts of from 0.1 to ten percent by weight of the resin, i.e., a resin containing both polyepoxide and polyhydric phenol.

In effecting the cure, the temperature range will vary with the particular polyhydric phenol and the amount of activator used. By proper selection of phenol and by proper adjustment of the amount of activator almost any desired curing temperature can be employed. Excellent rates of cure are obtained at temperatures ranging from about 100° C. to 200° C. and these are the preferred temperatures to be used. Temperatures much above 200° C. are generally not desirable, but may be employed if necessary.

In order to illustrate more clearly the use of accelerators in the process for making cured epoxide compositions according to this invention, reference is made to the following examples. The examples are illustrative only since modifications obviously will occur to those skilled in the art.

*Example 1*

A. In a reaction vessel equipped with an agitator, thermometer and condenser, about one mol of bisphenol is dissolved in ten mols of epichlorhydrin and one to two percent water is added to the resulting mixture. The mixture is then brought to 80° C. and two mols of sodium hydroxide are added in small portions over a period of about one hour. During the addition the temperature of the mixture is held at about 90° C. to 110° C. After the sodium hydroxide has been added, the water formed in the reaction and most of the epichlorhydrin is distilled off. The residue is combined with an approximately equal amount of benzene and the mixture filtered to remove the salt. The benzene is then removed to yield a viscous liquid having a weight per epoxide of 185.

B. In a suitable container, ten parts by weight of the polyepoxide of part A of this example and six parts by weight of bisphenol are combined and heated at a temperature under 100° C. until a clear solution results, whereupon 0.17 part by weight of a sixty percent aqueous solution of benzyltrimethyl ammonium chloride are rapidly stirred into the mixture. The mixture is poured into an aluminum cup and is heated at 110° C. Initial gelation occurs after six minutes.

The following table is a compilation of the results of treating other proportions of the polyepoxide of part A with bisphenol in the same manner as described in part B of this example, employing a sixty percent aqueous solution of benzyltrimethyl ammonium chloride as a catalyst for the process.

| Polyepoxide, Parts by Wt. | Bisphenol, Parts by Wt. | BTMACL,[1] Parts by Wt. | Gel Time (Minutes) at 110° C. |
|---|---|---|---|
| 10.0 | 0.0 | 0.17 | No gel in 480 minutes. |
| 10.0 | 6.0 | 0.17 | 6.[2] |
| 10.0 | 0.0 | 0.50 | No gel in 480 minutes. |
| 10.0 | 6.0 | 0.50 | 7. |

[1] BTMACL represents benzyltrimethyl ammonium chloride (sixty percent aqueous solution).
[2] See Example 1—part B.

*Example 2*

In accordance with the procedure outlined in Example 1, part B, several ten part aliquots of the polyepoxide of Example 1, part A, are combined with bisphenol. The effect of water and anhydrous benzyltrimethyl ammonium chloride as a catalyst for the process, as shown in the following table:

| Bisphenol, Parts by Wt. | BTMACL,[1] Parts by Wt. | Water, Parts by Wt. | Gel Time (Minutes) at 110° C. |
|---|---|---|---|
| 6.0 | 0.0 | 0.0 | No gel in 360 minutes. |
| 6.0 | 0.0 | 0.07 | Do. |
| 6.0 | 0.0 | 0.20 | Do. |
| 2.0 | 0.0 | 0.0 | Do. |
| 2.0 | 0.0 | 0.07 | Do. |
| 2.0 | 0.0 | 0.20 | Do. |
| 6.0 | 0.10 | 0.0 | 35. |

[1] BTMACL represents benzyltrimethyl ammonium chloride.

*Example 3*

In a suitable container, eleven parts by weight of the polyepoxide of Example 1, part A and nine parts by weight of a phenol-formaldehyde resin are combined and heated at a temperature below 100° C. until a clear melt results; whereupon 0.20 part by weight of a sixty percent aqueous solution of benzyltrimethyl ammonium chloride is stirred rapidly into the melt. The mixture is poured into an aluminum cup and is heated to 100° C. Initial gelation occurs after twenty-four minutes. The phenol-formaldehyde resin is a commercial non-heat reactive thermoplastic, one hundred percent phenolic resin (BR–9400—Bakelite), oil soluble and having an equivalent weight per hydroxyl of 153 and containing more than two phenolic hydroxyl groups per mol.

*Example 4*

A. In a reaction vessel equipped with agitator, condenser and thermometer, about 276 parts (three mols) of glycerol are mixed with 832 parts (nine mols) of epichlorhydrin. To this reaction mixture are added ten parts by weight of diethyl ether solution containing about 4.5 percent boron trifluoride, according to U.S. Patents 2,581,464. The temperature of this mixture is between 50° C. and 75° C. for about three hours. About 370 parts of the resulting glycerol-epichlorhydrin condensate are dissolved in nine hundred parts of dioxane containing about three hundred parts of sodium aluminate. While agitating, the reaction mixture is heated and refluxed at 93° C. for nine hours. After cooling to atmospheric temperature, the insoluble material is filtered from the reaction mixture and low boiling substances removed by distillation to a temperature of about 150° C. at 20 mm. pressure. The resulting polyglycidyl ether is a pale yellow viscous liquid containing between two and three epoxide groups per molecule. It has a weight per epoxide of 155.

B. In accordance with the procedure of Example 3, 15.5 parts by weight of the polyepoxide of part A of this example, 5.7 parts by weight of bisphenol and one part by weight of a sixty percent aqueous solution of benzyltrimethyl ammonium chloride are combined and heated at 150° C. Initial gelation of the composition occurs after seventy-six minutes.

*Example 5*

A. In a reaction vessel fitted with a stirrer, condenser and thermometer, four mols of bis(4-hydroxyphenyl)-2,2-propane (bisphenol) and five mols of epichlorhydrin are added to 6.43 mols of sodium hydroxide as a ten percent aqueous solution. While being stirred, the reaction mixture is gradually heated to about 100° C., during eighty minutes time and is maintained at 100° C. to 104° C. for an additional sixty minutes under reflux. The aqueous layer is decanted and the resin washed with boiling water until neutral to litmus whereupon the resin is drained and dehydrated by heating to about 150° C. The resulting glycidyl polyether has a softening point of 100° C. (Durrans' Mercury Method) and a weight per epoxide of 950.

B. In a suitable container, ten parts by weight of the polyepoxide of part A and 1.6 parts by weight of a phenol-formaldehyde resin are added, with stirring, to five parts by weight of methyl isobutyl ketone and five parts by weight of Cellosolve acetate. Into the resulting resinous solution are rapidly stirred 0.20 gram of a sixty percent aqueous solution of benzyltrimethyl ammonium chloride. A three mil film of the mixture is prepared and baked at 180° C. for thirty minutes. The resulting film was well cured, hard and tough, with good adhesion. The phenol-formaldehyde resin is a commercial, non-heat reactive (thermoplastic) one hundred percent phenolic, oil soluble resin (BR–9400—Bakelite) having an equivalent weight per hydroxide of 153 and containing more than two phenolic hydroxyls per mol.

*Example 6*

In the same manner as described in Example 5, part B, 38 parts by weight of the polyepoxide of Example 5, part A, and 2.28 parts by weight of bisphenol are combined in forty parts by weight of methyl isobutyl ketone; whereupon 0.50 part by weight of a sixty percent aqueous solution of benzyltrimethyl ammonium chloride are rapidly stirred into the resinous solution. A three mil film of the mixture is prepared and baked at 150° C. for thirty minutes. The resulting film is well cured, hard, tough and flexible.

*Example 7*

The polyepoxide of Example 1, part A (ten parts by weight) and six parts by weight of bisphenol are combined in a suitable container and heated at a temperature under 100° C. until a clear melt is obtained, whereupon 0.25 part by weight of anhydrous benzyltrimethyl ammonium sulphate is stirred rapidly into the melt. The mixture is poured into an aluminum cup and is heated at 110° C. Initial gelation occurs after forty minutes.

What is claimed is:

1. In the process for resinifying and curing a glycidyl polyether of a polyhydric compound of the group consisting of polyhydric phenols and polyhydric alcohols, said glycidyl polyether having an epoxy equivalency greater than one, wherein the glycidyl polyether and a polyhydric phenol are mixed and heat reacted and in a ratio of 0.1 to 1 phenol equivalent per epoxide equivalent, the improvement which comprises heat reacting the glycidyl polyether and the polyhydric phenol and admixing as an accelerator for the reaction from 0.1 to 10 percent based on the glycidyl polyether-phenol mixture of an activator consisting of a quaternary ammonium salt selected from the group consisting of tetraalkyl, aryl trialkyl and alkaryl trialkyl ammonium salts of strong acids wherein the aryl, alkaryl and alkyl substituents have no more than eight carbon atoms, considering an epoxide equivalent as the weight in grams of glycidyl polyether per epoxide group, and an equivalent phenol as the weight in grams of phenol per phenolic hydroxyl group.

2. The infusible, insoluble resin resulting from the reaction of claim 1.

3. The process of claim 1 wherein the polyether is a glycidyl polyether of a polyhydric phenol and wherein the quaternary ammonium salt is a quaternary ammonium halide.

4. The process of claim 3 wherein the polyether is a glycidyl polyether of a polyhydric phenol having 1-2-epoxy equivalency greater than one and a weight per epoxide not exceeding 1000, and wherein the polyhydric phenol is a thermoplastic phenol-formaldehyde resin having more than two phenolic hydroxyls per mol.

5. The process of claim 3 wherein the polyhydric phenol is bis(4 - hydroxy phenyl) - 2,2 - propane and wherein the quaternary ammonium halide is benzyltrimethyl ammonium chloride.

6. A heat curable composition of matter comprising a mixture of a glycidyl polyether of a polyhydric phenol having a weight per epoxide not exceeding one thousand with from 0.1 to one up to one to one equivalent of polyhydric phenol per epoxide equivalent and from 0.1 percent to ten percent by weight of the polyether-phenol mixture of a quaternary ammonium salt selected from the group consisting of tetraalkyl, aryl trialkyl, and alkaryl trialkyl ammonium salts of strong acids wherein the aryl, alkaryl and alkyl substituents have no more than eight carbon atoms, considering an epoxide equivalent as the weight in grams of glycidyl polyether per epoxide group, and an equivalent phenol as the weight of phenol per phenolic hydroxyl group.

References Cited in the file of this patent

UNITED STATES PATENTS

| | | |
|---|---|---|
| 2,521,912 | Greenlee | Sept. 12, 1950 |
| 2,752,269 | Condo et al. | June 26, 1956 |
| 2,768,992 | Zukas | Oct. 30, 1956 |

OTHER REFERENCES

"Polymer Processes" (Schildknecht), published by Interscience (N.Y.), 1956 (page 443 relied on; copy in Scientific Library).